United States Patent [19]
Kitamura et al.

[11] 4,186,176
[45] Jan. 29, 1980

[54] METHOD OF SIMULTANEOUSLY REMOVING SULFUR DIOXIDE AND NITROGEN OXIDES FROM EXHAUST GASES

[75] Inventors: Taketsugu Kitamura; Hitoshi Takagi, both of Kurashiki, Japan

[73] Assignee: Asahi Kasei Kogyo Kabushiki Kaisha, Osaka, Japan

[21] Appl. No.: 927,249

[22] Filed: Jul. 21, 1978

[30] Foreign Application Priority Data

Aug. 4, 1977 [JP] Japan .................................. 52/93003
Nov. 22, 1977 [JP] Japan .................................. 52/13941

[51] Int. Cl.$^2$ ....................... C01B 17/04; B01D 53/00
[52] U.S. Cl. ..................................... 423/235; 423/242; 423/574 L
[58] Field of Search ................... 423/235, 242 A, 575, 423/561, 574

[56] References Cited
U.S. PATENT DOCUMENTS

| | | | |
|---|---|---|---|
| 3,411,875 | 11/1968 | Yoshikawa et al. | 423/515 |
| 3,719,742 | 3/1973 | Terrana et al. | 423/242 A |
| 4,013,430 | 3/1977 | Adachi et al. | 423/242 A |
| 4,091,074 | 5/1978 | Gorai et al. | 423/242 A |

Primary Examiner—G. O. Peters
Attorney, Agent, or Firm—Sprung, Felfe, Horn, Lynch & Kramer

[57] ABSTRACT

A method of simultaneously removing sulfur dioxide and nitrogen oxides from an exhaust gas which comprises the steps of:

contacting the exhaust gas with an aqueous absorbing solution containing an iron chelate complex and an alkali metal sulfite to form alkali metal sulfur oxides comprising an alkali metal dithionate in the aqueous absorbing solution;

separating the alkali metal sulfur oxides formed and accumulated from part or the whole of the aqueous absorbing solution by crystallization; and subjecting the alkali metal sulfur oxides separated together with a carbonaceous material to decomposition-reduction reaction at a temperature of at least about 700° C. to form an alkali metal sulfide and a gas comprising sulfur dioxide and carbon dioxide.

17 Claims, 2 Drawing Figures

METHOD OF SIMULTANEOUSLY REMOVING SULFUR DIOXIDE AND NITROGEN OXIDES FROM EXHAUST GASES

BACKGROUND OF THE INVENTION

1. Field of the Invention

This invention relates to a method of treating exhaust gases containing sulfur dioxide and nitrogen oxides including nitrogen monoxide, nitrogen dioxide and the like. More particularly, it relates to a wet method of simultaneously removing sulfur dioxide and nitrogen oxides by contacting an exhaust gas containing sulfur dioxide and nitrogen oxides with an aqueous absorbing solution containing an iron chelate complex and an alkali metal sulfite and converting alkali metal sulfur oxides comprising an alkali metal dithionate formed and accumulated in the aqueous absorbing solution into useful sources.

2. Description of the Prior Art

The sulfur dioxide and nitrogen oxides which are contained in combustion exhaust gases discharged from industrial combustion installations such as boilers are pollutants causing air pollution, and it is an important problem to remove these pollutants. Many methods of removing these poison gases have been proposed. For example, U.S. Pat. No. 3,984,522 describes the use of an aqueous solution containing an iron chelate complex and an alkali metal sulfite as an absorbing solution in a wet method of removing sulfur dioxide and nitrogen oxides simultaneously. However, in industrially carrying out this method, an alkali metal dithionate are by-produced in the absorbing solution when sulfur dioxide and nitrogen oxides are removed from exhaust gases by absorption and accordingly, it is required to efficiently and economically treat and recover, as a useful source, the alkali metal dithionate. According to U.S. Pat. No. 4,044,101, the alkali metal dithionate which is recovered from the absorbing solution by crystallization is thermally decomposed to form an alkali sulfate and sulfur dioxide from which an alkali metal sulfite and gypsum are recovered. The alkali metal sulfite recovered can be reused as an absorbing agent, but the by-produced gypsum is hardly considered as a useful source.

Also it is known that the alkali metal sulfate, for example, sodium sulfate formed by the thermal decomposition of the alkali metal dithionate is reduced with carbon to sodium sulfide in connection with a kraft pulping process.

SUMMARY OF THE INVENTION

According to the present invention there is provided a method of simultaneously removing sulfur dioxide and nitrogen oxides from an exhaust gas which comprises the steps of:

contacting the exhaust gas with an aqueous absorbing solution containing an iron chelate complex and an alkali metal sulfite to form alkali metal sulfur oxides comprising an alkali metal dithionate in the aqueous absorbing solution;

separating the alkali metal sulfur oxides formed and accumulated from part or the whole of the aqueous absorbing solution by crystallization; and subjecting the alkali metal sulfur oxides separated together with a carbonaceous material to decomposition-reduction reaction at a temperature of at least about 700° C. to form an alkali metal sulfide and a gas comprising sulfur dioxide and carbon dioxide.

The method of this invention may further comprises the steps of:

converting the alkali metal sulfide to an aqueous solution thereof; and reacting the aqueous solution with carbon dioxide to form an alkali metal carbonate and hydrogen sulfide.

DETAILED DESCRIPTION OF THE INVENTION

Figure 1:
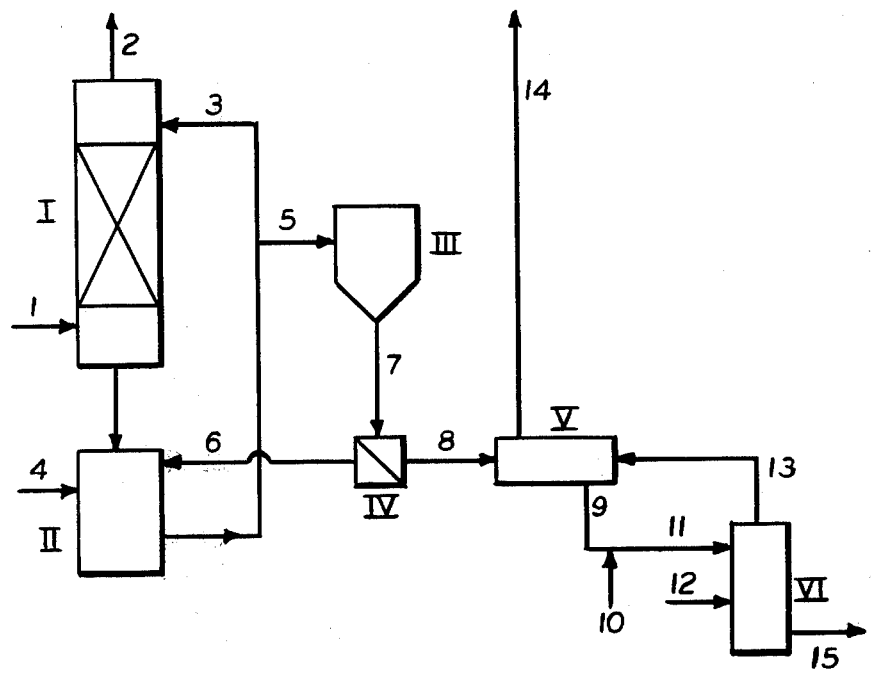
FIG. 1 is a flow diagram illustrating one embodiment of the method of this invention.

The iron chelate complexes which can be used as absorbing agents in this invention are complex ions or their water soluble salts formed by coordinating ferric ion or ferrous ion which is formed by dissolving an iron compound such as ferric sulfate, ferrous sulfate and ferrous chloride into water, with an chelating agent as an aminopolycarboxylic acid. As the absorbing agent for nitrogen oxides, the ferric chelate complexes are effective, but the ferrous chelate complexes are converted into the ferric chelate complexes by the reduction with an alkali metal sulfite which is present in the aqueous absorbing solution. Thus, the ferrous chelate complexes and any mixtures of the ferrous chelate complexes in addition the ferric chelate complexes can also be employed in this invention.

Exemplary aminopolycarboxylic acids which can be used as chelating agents in this invention include ethylenediaminetetraacetic acid, ethylenediaminetetrapropionic acid, 1,2-propylenediaminetetraacetic acid, diethylenetriamine-N,N,N',N'',N''-pentaacetic acid, N-hydroxyethylethylenediamine-N,N',N'-triacetic acid, nitrilotriacetic acid, nitrilotripropionic acid, mixtures of the acids, alkali salts of the acids and mixtures of the acids and their alkali salts. Of these compounds, ethylenediaminetetraacetic acid, nitrilotriacetic acid and their alkali salts are especially preferred in this invention.

Exemplary alkali metal sulfites which can be used in this invention include potassium sulfite, sodium sulfite, potassium hydrogensulfite and sodium hydrogensulfite.

Since the alkali metal hydrogensulfites are formed by reacting the sulfur dioxide in an exhaust gas with an alkali metal carbonate and an alkali metal hydrogencarbonate which are recycled and reused in this invention, they can be suitably used as the alkali metal sulfites in this invention.

The aqueous absorbing solution of this invention contains the iron ion in a concentration of about 0.05 to about 1.0 g-ion per liter of the solution, and preferably about 0.05 to about 0.5 g-ion per liter of the solution; the aminopolycarboxylic acid in a concentration of about 0.5 to about 2.0 moles per 1 g-ion of the iron ion, and preferably about 0.9 to about 1.5 moles per 1 g-ion of the iron ion; and the alkali metal sulfite in a concentration of about 0.05 to about 1.0 mole per liter of the solution, and preferably about 0.1 to about 0.7 mole per liter of the solution.

The pH of the aqueous absorbing solution used in this invention ranges typically from about 4 to about 9, and preferably from about 5 to about 8.

The aqueous absorbing solution of this invention containing the iron chelate complex or its water soluble salt and the alkali metal sulfite is contacted with an exhaust gas containing sulfur dioxide and nitrogen oxides to absorb therein the sulfur dioxide and nitrogen oxides. The temperature of the aqueous absorbing solution and the temperature of contacting the exhaust gas with the aqueous absorbing solution used in this invention ranges typically from about 40° C. to about 100° C. and preferably from about 50° C. to 80° C. The amount of the aqueous absorbing solution contacted with the exhaust gas which is used in this invention ranges typically from about 0.5 to about 5 liters per N m$^3$ of the exhaust gas per hour, and preferably from about 1 to about 4 liters per N m$^3$ of the exhaust gas per hour.

Part or the whole of the aqueous absorbing solution contacted with the exhaust gas is cooled and/or concentrated to crystallize alkali metal sulfur oxides comprising an alkali metal dithionate formed, and then the crystals are separated from the aqueous absorbing solution. The mother liquor can be recycled and reused as the aqueous absorbing solution. The crystals containing alkali metal sulfur oxides comprising, an alkali metal dithionate separated are mixed with a carbonaceous material and the mixture is subjected to decomposition-reduction reaction at a temperature of at least about 700° C. to form and recover an alkali metal sulfide, sulfur dioxide and carbon dioxide. Although the alkali metal sulfur oxides formed and accumulated in the aqueous absorbing solution contain an alkali metal sulfate and a sulfonic acid derivative of ammonia such as an alkali metal imidodisulfonate [NH(SO$_3$M)$_2$:M being an alkali metal] in addition to the alkali metal dithionate, these sulfur oxide compounds can be isolated by crystallization together with the alkali metal dithionate or separately, and converted into an alkali metal sulfide, sulfur oxide and nitrogen by the above described thermal decomposition-reduction reaction.

Exemplary carbonaceous materials which can be used in the decomposition-reduction reaction of alkali metal sulfur oxides comprising an alkali metal dithionate in this invention include reducing agents whose ash content is low and which are comparatively inexpensive such as coal, coke and petrocoke; materials such as natural gas, methane and carbon monoxide; and pulp-digesting residues. Further, even when these carbonaceous materials are contaminated with sulfur-containing substances, they can be used without any problem in this invention since such sulfur-containing substances are effectively recovered in the subsequent steps.

As the heating method in the decomposition-reduction reaction any conventional external heating methods can be employed in this invention. Furthermore, a method of partially burning part of the carbonaceous material added with a molecular oxygen-containing gas such as air can preferably be employed in this invention.

The temperature of the decomposition-reduction reaction which can be employed in this invention is typically at least about 700° C., and preferably ranges about 850° C. to about 1000° C. from an economical standpoint. When the temperature is lower than about 700° C. the rate of reaction and the yield of an alkali metal sulfide are low.

In this invention use of the high temperature gas formed in the decomposition-reduction reaction for drying the alkali metal sulfur oxides comprising an alkali metal dithionate to remove their adhering water and crystal water prior to the decomposition-reduction reaction is advantageous from the viewpoint of thermal efficiency.

Furthermore, according to this invention the alkali metal sulfide thus formed is converted to an aqueous solution thereof and the solids are removed by filtration and the filtrate as such may become a commercial product or the filtrate may be solidified by condensation for a commercial product. Furthermore, the filtrate can be reacted with carbon dioxide to form an alkali metal carbonate and hydrogen sulfide. In the reaction of the alkali metal sulfide with carbon dioxide in order to increase the absorbability of carbon dioxide in the aqueous solution of the alkali metal sulfide and to fully carry out the reaction a two-step method is preferred.

More specifically, the first step is carried out at a temperature of about 60° C. to about 100° C. while maintaining the pH of the aqueous solution of the alkali metal sulfide to about 9 to about 12 to effect the following main reaction;

$$2M_2S + CO_2 + H_2O \rightarrow M_2CO_3 + 2MHS$$

wherein M is an alkali metal including potassium and sodium.

The second step is carried out at a temperature of about 60° C. to about 100° C. while maintaining the pH of the aqueous solution of the alkali metal sulfide to about 7 to about 9 to effect the following main reaction;

$$MHS + CO_2 + H_2O \rightarrow MHCO_3 + H_2S \uparrow$$

wherein M is the same as defined above.

The hydrogen sulfide formed can be recovered either as elemental sulfur by the conventional Kraus method or as sulfuric acid. Furthermore, when part of the gas containing sulfur dioxide formed in the previous decomposition-reduction reaction is employed in the consecutive Kraus method of producing sulfur, the Kraus method can be simplified as shown below to increase the overall efficiency of the purification of exhaust gases.

$$2H_2S + SO_2 \rightarrow 3S + 2H_2O$$

The carbon dioxide which is employed in this invention can be supplied from the outside of the recycling system. Also, the mixed gas of sulfur dioxide and carbon dioxide which is by-produced in the decomposition-reduction reaction of the crystals including an alkali metal dithionate together with a carbonaceous material can be employed as the carbon dioxide starting material. That is, when this mixed gas is contacted with an aqueous alkaline solution, the sulfur dioxide is removed by the absorption in the aqueous alkaline solution and as a result, carbon dioxide free from sulfur dioxide can be obtained.

Exemplary aqueous alkaline solutions which may be employed in this invention include aqueous solutions of potassium carbonate, sodium carbonate, potassium hydroxide and sodium hydroxide and absorbing solutions for sulfur dioxide and nitrogen oxides.

When an aqueous solution of potassium carbonate or sodium carbonate is employed as the aqueous alkaline solution, carbon dioxide is generated from the aqueous alkaline solution by the reaction between the potassium or sodium carbonate and sulfur dioxide, and joins the carbon dioxide already present in the mixed gas. When the absorbing solution for sulfur dioxide and nitrogen oxides is employed, carbon dioxide is generated due to the presence of an alkali metal carbonate and an alkali metal hydrogencarbonate in addition to an alkali metal sulfite which react with sulfur dioxide. Thus, the absorbing solution employed in this reaction is enriched in the alkali metal sulfite by the absorption of sulfur dioxide therein and accordingly, can be appropriately reused and recycled as the absorbing solution. Thus, in this invention the absorbing solution is preferably employed for removing the sulfur dioxide from the mixed gas.

The slurry containing an alkali metal carbonate and an alkali metal hydrogencarbonate which have been produced in the reaction between an aqueous solution of an alkali metal sulfide and carbon dioxide may be employed as an alkali source for the absorbing solution either as such or after concentration or in the form of solids separated therefrom by crystallization. Thus, the absorbing solution contains an alkali metal carbonate and an alkali metal hydrogencarbonate.

The mother liquor from which the alkali metal carbonate and alkali metal hydrogencarbonate have been removed contains an alkali metal sulfide and alkali metal hydrogensulfide and may be employed as a coolant and a solvent for a melt alkali metal sulfide from the decomposition-reduction reaction.

In the present invention the nitrogen oxides and sulfur dioxide is firstly absorbed in the absorbing solution and then the nitrogen oxides are discharged as nitrogen gas out of the present purification system for exhaust gases and the sulfur dioxide is discharged as hydrogen sulfide out of the present system, and if necessary or if desired, the sulfur dioxide can be converted to elemental sulfur or sulfuric acid. The alkali metal sulfide, carbon dioxide and sulfur dioxide formed by the decomposition-reduction reaction are converted to an alkali metal sulfite, and alkali metal carbonate and an alkali metal hydrogencarbonate and this conversion can be operated using the materials present within the recycling system. Furthermore, all the products formed in this conversion can be combined with the absorbing solution, reused and recycled within the present system without substantially causing disadvantageous side reactions.

Thus, according to the present invention there is provided an excellent closed system for treating exhaust gases containing sulfur dioxide and nitrogen oxides.

To provide a clear and better understanding of this invention, reference will now be made to preferred embodiments thereof in connection with the flow diagrams shown in the drawings.

Firstly, the recovery of an alkali metal sulfide and a gas comprising sulfur dioxide and carbon dioxide according to this invention will be explained in greater detail.

In the embodiment of this invention illustrated in FIG. 1, I denotes an absorbing column; II a recycling tank for an absorbing solution; III a crystallizing vessel; IV a separator; V a drier; and VI a reducing furnace.

An exhaust gas discharged from a coal combustion boiler and the like after cooling and removing dust therefrom in a prescrubber and the like is supplied to absorpting column I through an inlet 1 and countercurrently contacted with an absorbing solution from recycling tank II from route II-3-I. In absorbing column II, sulfur dioxide and nitrogen oxides are removed from the exhaust gas by absorption and the purified gas is discharged from an outlet 2. The absorbing solution from absorbing column I is led to recycling tank II and stayed there at a temperature of about 40° C. to about 100° C. for about 5 to about 10 minutes. After the pH of the absorbing solution is adjusted to about 4 to about 9 by an alkali metal carbonate supplied from an inlet 4, the absorbing solution is recycled to absorbing column I for removing sulfur dioxide and nitrogen oxides in the gas. Also, part of the absorbing solution is led to crystallizing vessel III through route II-5-III where an alkali metal dithionate and its hydrates in the absorbing solution are crystallized by evaporation-condensation and/or cooling, and a slurry containing the crystals formed is led to separator IV through route III-7-IV. In separator IV the crystals are separated from the slurry and introduced into drier V through route IV-8-V while the mother liquor is returned to recycling tank II through route IV-6-II for reuse as the absorbing solution. In drier V the adhering water and the crystal water of crystals of the alkali metal dithionate and the hydrates are removed with a high temperature gas which has been formed in reducing furnace VI and supplied from reducing furnace VI through route VI-13-V, while a gas containing sulfur dioxide and carbon dioxide is collected from an outlet 14. A prescribed amount of a carbonaceous material which is supplied from an inlet 10 is added to the crystals dried supplied from drier V through route V-9 and the mixture is introduced into reducing furnace VI through route 11 and heated at a temperature of at least about 700° C. In order to maintain this temperature air is supplied to reducing furnace VI from an inlet 12 and part of the carbonaceous material is burned. The high temperature gas containing sulfur dioxide and carbon dioxide formed by the decomposition-reduction reaction and the partial burning of part of the carbonaceous material in reducing furnace VI is introduced into drier V through route 13 while a melt mixture containing an alkali metal sulfide formed by the decomposition-reduction reaction is collected from an outlet 15.

Secondly, the recovery of an alkali metal carbonate and hydrogen sulfide from the alkali metal sulfide obtained in the above-described system illustrated in FIG. 1 will now be explained.

In another embodiment of this invention illustrated in FIG. 1, I, II, III, IV, V and VI, each denotes the same as in FIG. 1; VII denotes an absorbing column for sulfur dioxide; VIII a vessel for quenching and dissolving a melt mixture containing an alkali metal sulfide; into water; IX a filter; X a first converter; XI a second converter; XII a separator of an alkali metal carbonate and an alkali metal hydrogencarbonate; and 1, 2, 3, 4, 5, 6, 7, 8, 9, 10, 11, 12, 13, 14 and 15, each denotes the same as in FIG. 1.

The melt mixture containing an alkali metal sulfide which has been withdrawn from reducing furnace VI is introduced into vessel VIII through route 15 where the melt mixture is added with water supplied from an inlet 21 through route 21-22-VIII and the mother liquor supplied from separator XII through XII-29-22-VIII and quenched to form an aqueous solution of an alkali metal sulfide. Then, the solution is introduced into filter IX through route 20 and ashes and unreacted carbonaceous material are separated and discharged from an outlet 23. On the other hand, the aqueous solution of the alkali metal sulfide free from the insolubles is led to first converter X. Also, part of the gas containing sulfur dioxide and carbon dioxide discharged from drier V is introduced into absorbing column VII through route V-17-VII where the sulfur dioxide is removed by absorption with part of the absorbing solution supplied from II-16-VII and then a gas containing carbon dioxide is led to first converter X through route VII-18-X, while the absorbing solution is returned to absorbing column II through route VII-19-II to reuse in the absorbing procedures. The remaining gas containing sulfur dioxide and carbon dioxide discharged from drier V is withdrawn from an outlet 14 and led to a conventional process of converting the sulfur dioxide into hydrogen sulfide and subsequently to elemental sulfur, which is not shown in FIG. 2.

In first converter X the aqueous solution of an alkali metal sulfide supplied through route IX-24-X is contacted with the gas containing carbon dioxide free from sulfur dioxide supplied through route VII-18-X to absorb the carbon dioxide therein and the pH of the aqueous solution of an alkali metal sulfide is adjusted to from about 9 to about 10. The resulting aqueous solution having a pH of about 9 to about 10 is introduced into second converter XI through route 26 and contacted with a gas containing unreacted carbon dioxide introduced therein through route X-25-XI and the pH of the aqueous solution is adjusted to from about 8 to about 9. The gas containing hydrogen sulfide formed in second converter XI is withdrawn from an outlet 28 and led to a conventional process of converting the hydrogen sulfide to elemental sulfur, which is not shown in FIG. 2.

A slurry containing an alkali metal carbonate and an alkali metal hydrogencarbonate as well as unreacted alkali metal sulfide and unreacted alkali metal hydrogen sulfide is withdrawn from second converter XI and supplied to separator XII through route 27 where the alkali metal carbonate and the alkali metal hydrogencarbonate are separated in the form of a cake and led to absorbing column II through route XII-30-II to reuse as the absorbing procedures. On the other hand, the mother liquor containing the alkali metal sulfide and the alkali metal hydrogensulfide is returned to vessel VIII for reuse through route XII-29-22-VIII.

The present invention will now be illustrated in more detail by the following non-limiting examples.

EXAMPLE 1

The method as illustrated in FIG. 1 was employed in this Example. An exhaust gas discharged from a coal combustion boiler containing 2,200 ppm of sulfur dioxide, 300 ppm of nitrogen oxides and 4.8 percent by volume of molecular oxygen was treated in a rate of 1,000 N m$^3$ per hour with, as the absorbing solution, an aqueous solution containing an iron-ethylenediaminetetraacetic acid complex in a concentration of 0.2 mole per liter, sodium sulfite in a concentration of 0.3 to 0.4 mole per liter, sodium sulfate in a concentration of 0.8 mole per liter and sodium dithionate in a concentration of 0.6 mole per liter. A packed column having a height of 5 m and a diameter of 0.6 m was employed as absorbing column I, and a tank having a volume of 1 m$^3$ was employed as recycling tank II for the absorbing solution. The treatment of the exhaust gas was conducted in a ratio of the liquid to the gas of 10 l/N m$^3$ for a reducing period of time of 6 minutes while maintaining the absorbing solution at 55° C. to 60° C. and the pH of the absorbing solution at 6 to 6.5 by supplying thereto sodium carbonate in a rate of about 54 moles per liter from an inlet 4. As the result, the concentration of the sulfur dioxide in the treated exhaust gas from an outlet 2 became 20 ppm, i.e., the ratio of removing sulfur dioxide of 99 percent and the concentration of the nitrogen oxides in the treated exhaust gas from an outlet 2 became 30 ppm, i.e., the ratio of removing nitrogen oxides of 90 percent. Accordingly, the treated exhaust gas was substantially non-contaminative. In this treatment the amount of sodium dithionate formed was about 44 moles per hour and the amount of sodium sulfate formed was about 10 moles per hour.

Part of the absorbing solution was introduced into crystallizing vessel III in a rate of 110 liters per hour and cooled therein to 10° C., and then the slurry containing sodium dithionate crystallized was led to separator IV where the crystals were separated from the liquid by filtration, resulting in the crystals having the following composition in a rate of 14.5 Kg per hour. On the other hand, when the filtrate was returned to absorbing column II, the initial composition and the absorbability of the absorbing solution were maintained.

Composition of Crystals

| Component | Percent by Weight |
| --- | --- |
| $Na_2S_2O_6 \cdot 2H_2O$ | 70 |
| $Na_2SO_4 \cdot 10H_2O$ | 25 |
| $H_2O$ | 5 |

Part of the crystals were dried at 120° C. and then 200 g of the crystals were thoroughly mixed with 55 g of finely pulverized coal having the following composition;

| Component | Percent by Weight |
| --- | --- |
| C | 67.5 |
| $H_2$ | 5.5 |
| S | 3.5 |
| $O_2$ | 8.0 |
| Ashes | 12.0 |
| Water | 2.0 |
| Others | 1.5 |

The mixture was charged in a quartz glass vessel having a diameter of 50 mm and a depth of 300 mm and heated at 900° C. in an electric furnace for 30 minutes. The generated gas was recovered from the top of the quartz glass vessel. After the reaction the vessel was cooled and the reaction product was taken out of the vessel. The composition of the product was as follows:

| Component | Percent by Weight |
| --- | --- |
| $Na_2S$ | 94.6 |
| $Na_2S_2O_3$ | 1.9 |
| $Na_2SO_3$ | 3.5 |
| $Na_2SO_4$ | 0 |

The amount of $SO_2$ in the generated gas was 0.80 mole and the composition of the generated gas was as follows:

| Component | Percent by Volume |
| --- | --- |
| $SO_2$ | 33 |
| $CO_2$ | 67 |

EXAMPLE 2

Figure 2:
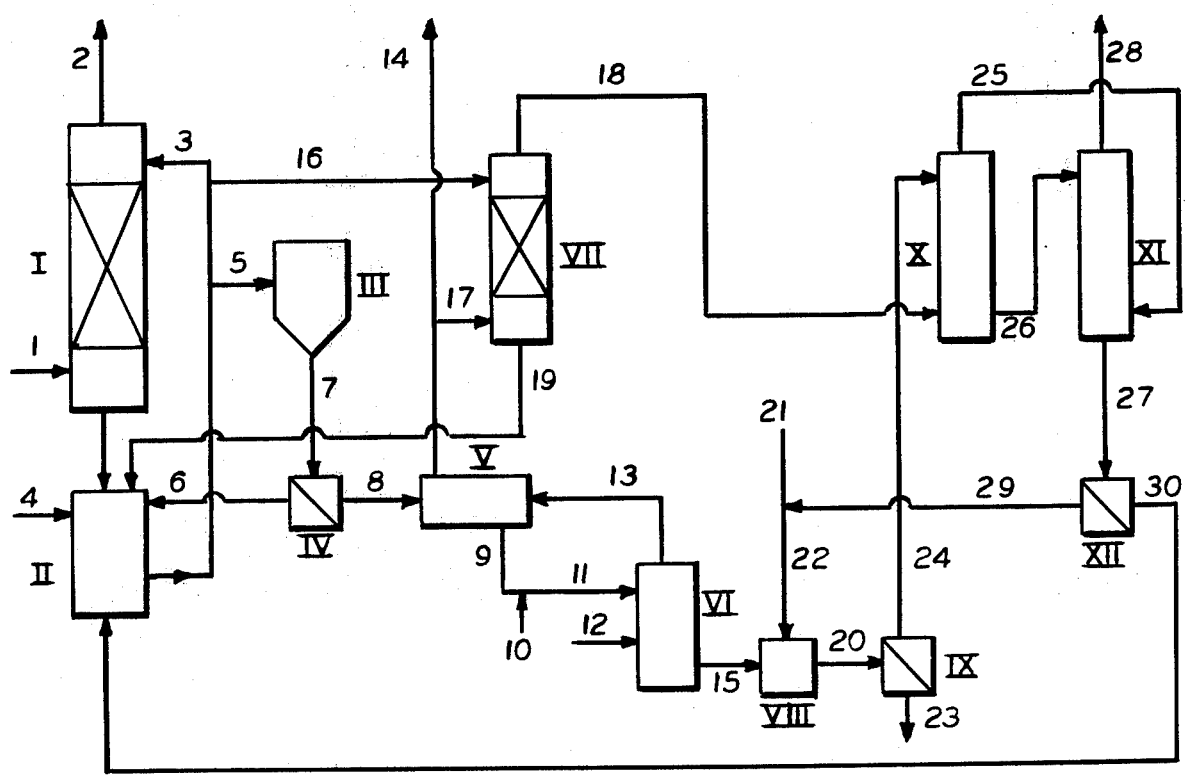
FIG. 2 is a flow diagram illustrating another embodiment of the method of this invention.

The method as illustrated in FIG. 2 was employed in this Example. An exhaust gas discharged from a coal combustion boiler containing 2,200 ppm of sulfur dioxide, 600 ppm of nitrogen oxides and 4.8 percent by volume of molecular oxygen was treated in a rate of 1,000 N m³ per hour with, as the absorbing solution, an aqueous solution containing an ironethylenediaminetetraacetic acid complex in a concentration of 0.2 mole per liter, sodium sulfite in a concentration of 0.3 to 0.4 mole per liter, sodium sulfate in a concentration of 0.6 mole per liter and sodium dithionate in a concentration of 0.6 mole per liter. The same column and the same tank as in Example 1 were employed as absorbing column I and tank II for the absorbing solution. When the treatment of the exhaust gas was conducted for a reducing period of time of 10 minutes while maintaining the absorbing solution at 55° C. to 60° C. and the pH of the absorbing solution at 6 to 6.5 As the result, the concentration of the sulfur dioxide in the treated exhaust gas from an outlet 2 was 20 ppm, i.e., the ratio of removing sulfur dioxide of 99 percent, and the concentration of the nitrogen oxides was 90 percent.

Part of the absorbing solution was introduced into crystallizing vessel III in a rate of 110 liters per hour and cooled therein to 10° C. to 15° C., and the slurry containing sodium dithionate having two moles of crystal water and sodium sulfate having ten moles of crystal water crystallized was led to separator IV and separated into the crystals and the mother liquor. The mother liquor was returned for reuse as the absorbing solution to recycling tank II for the absorbing solution through route 6. The crystals separated contained 70 percent by weight of sodium dithionate having two moles of crystal water and 25 percent by weight of sodium sulfate having ten moles of crystal water and the total amount of the crystals containing water was produced in a rate of about 18 Kg per hour. The crystals thus produced were washed with water and introduced into drier V through route 8 and after the adhering water and the crystal water of the crystals were removed with a high temperature gas formed in and supplied from reducing furnace VI through route 13, the crystals dried was fed to reducing furnace VI. About 50 percent by volume of the gas containing sulfur dioxide and carbon dioxide discharged from drier V was fed to absorbing column VII through route 17 where the sulfur dioxide was removed by washing with part of the absorbing solution supplied through route 16 in a rate of about 1 m³ per hour. The gas containing carbon dioxide discharged from absorbing column VII was led to first converter X through route 18 while the absorbing solution from absorbing column VII was returned for reuse as the absorbing solution to recycling tank II through route 19. The remaining gas containing about 30 moles of sulfur dioxide and carbon dioxide discharged from drier V was collected from an outlet 14 and introduced into a process of converting the sulfur dioxide into hydrogen sulfide, resulting in elemental sulfur.

On the other hand, the crystals containing sodium dithionate in an amount of 52 moles per hour and sodium sulfate in an amount of 13 moles per hour from drier V were added and sufficiently mixed with finely pulverized carbon supplied from an inlet 10 in an amount of about 35 Kg per hour which corresponded to about 1.5 times the amount of carbon stoichiometrically necessary for complete reduction, and the mixture was introduced into reducing furnace VI through route 11. In reducing furnace VI the mixture was heated at a temperature of 850° C. to 950° C. and in order to maintain this temperature part of the finely pulverized carbon was burned by adding therein air from an inlet 12.

A high temperature gas containing sulfur dioxide and carbon dioxide formed by the decomposition-reduction and the partial burning of the finely pulverized carbon was introduced into drier V. On the other hand, a melt mixture containing sodium sulfide was withdrawn and supplied to vessel VIII for quenching and dissolving the melt mixture into water through route 15 where the melt mixture was added with water supplied from an inlet 21 and the mother liquor separated from sodium carbonate and sodium hydrogencarbonate in separator XII and supplied through route 29, and quenched to form an aqueous solution of sodium sulfide. This aqueous solution was introduced into filter IX through route 20 where ashes and unreacted finely pulverized carbon were separated from the aqueous solution of sodium sulfide and discharged from an outlet 23. On the other hand, the aqueous solution was led to first converter X through route 24.

Into first converter X the gas containing carbon dioxide free from sulfur dioxide was fed through route 18 and the carbon dioxide was absorbed in the aqueous solution of sodium sulfide and the pH of the aqueous solution was adjusted to 9 to 10. The aqueous solution having a pH of 9 to 10 was led to second converter XI through route 26 to contact with the gas containing unreacted carbon dioxide through route X-25-XI and the pH of the aqueous solution was adjusted to 8 to 9. The gas containing hydrogen sulfide formed in a rate of 65 moles per hour in second converter XI was collected from an outlet 28 and led to a process of converting hydrogen sulfide into elemental sulfur, resulting in elemental sulfur.

The slurry containing sodium carbonate and sodium hydrogencarbonate as well as unreacted sodium sulfide and sodium hydrogen sulfide withdrawn from second converter XI was introduced into separator XII where the sodium carbonate and the sodium hydrogencarbonate were separated in a rate of 33 moles per hour and 65 moles per hour, respectively, and the cake containing the sodium carbonate and sodium hydrogencarbonate was returned to absorbing column II for reuse as the aqueous absorbing procedures while the mother liquor containing sodium sulfide and sodium hydrogensulfide was returned to vessel VIII through route 29-22 for reuse as described above.

While the invention has been described in detail and with reference to specific embodiments thereof, it will be apparent to one skilled in the art that various changes and modifications can be made therein without departing from the spirit and scope thereof.

What is claimed is:

1. A method of simultaneously removing sulfur dioxide and nitrogen oxides from an exhaust gas which comprises:
    contacting the exhaust gas with an aqueous absorbing solution containing an iron chelate complex and an alkali metal sulfite to form alkali metal sulfur oxides comprising an alkali metal dithionate in the aqueous absorbing solution;
    separating the alkali metal sulfur oxides formed and accumulated from part or the whole of the aqueous absorbing solution by crystallization; and subjecting the alkali metal sulfur oxides separated together with a carbonaceous material to decomposition-reduction reaction at a temperature of at least about 700° C. to form an alkali metal sulfide and a gas comprising sulfur dioxide and carbon dioxide.

2. The method as claimed in claim 1, wherein the mother liquor separated from the alkali metal sulfur oxides comprising the alkali metal dithionate is reused as the aqueous absorbing solution for further exhaust gas treatment.

3. The method as claimed in claim 1, wherein the carbonaceous material is coal.

4. The method as claimed in claim 1, wherein the decomposition-reduction reaction is carried out at a temperature of about 850° C. to about 1,000° C.

5. The method as claimed in claim 1, wherein the iron chelate complex is a complex of ferric ion and/or ferrous ion with an aminopolycarboxylic acid.

6. The method as claimed in claim 5, wherein the aminopolycarboxylic acid is ethylenediaminetetraacetic acid.

7. The method as claimed in claim 1, wherein the alkali metal sulfite is sodium sulfite.

8. The method as claimed in claim 1, wherein the method further comprises:
converting the alkali metal sulfide to an aqueous solution thereof; and
reacting the aqueous solution with carbon dioxide to form an alkali metal carbonate and hydrogen sulfide.

9. The method as claimed in claim 8, wherein the reaction between the aqueous solution of the alkali metal sulfide and carbon dioxide is carried out in a two-step process comprising conducting the reaction in a pH of about 9 to about 12 to form an alkali metal carbonate and conducting the reaction in a pH of about 7 to about 9 to form hydrogen sulfide.

10. The method as claimed in claim 8, wherein the carbon dioxide free from sulfur dioxide obtained by treating a mixed gas of sulfur dioxide and carbon dioxide having been produced in the decomposition-reduction reaction of the alkali metal sulfur oxides together with a carbonaceous material is employed as the carbon dioxide in the reaction between the aqueous solution of the alkali metal sulfide and carbon dioxide.

11. The method as claimed in claim 10, wherein the aqueous absorbing solution and at the same time the carbon dioxide generated from the carbonate radical in the aqueous absorbing solution are employed to treat the mixed gas of sulfur dioxide and carbon dioxide.

12. The method as claimed in claim 10, wherein an aqueous alkaline solution having absorbed sulfur dioxide is reused as the aqueous absorbing solution.

13. The method as claimed in claim 8, wherein the mother liquor from which the alkali metal carbonate and the alkali metal hydrogencarbonate have been removed is employed in preparing the aqueous alkali metal sulfide solution.

14. The method as claimed in claim 8, wherein the alkali metal carbonate and the alkali metal hydrogencarbonate separated is reused as the absorbing solution.

15. The method as claimed in claim 8, wherein the mother liquor separated from the alkali metal sulfur oxides comprising the alkali metal dithionate is reused as the aqueous absorbing solution for further exhaust gas treatment.

16. A method of simultaneously removing sulfur dioxide and nitrogen oxides from an exhaust gas which comprises the steps of:
(a) contacting the exhaust gas with an aqueous absorbing solution containing an iron chelate complex and an alkali metal sulfite to form alkali metal sulfur oxides comprising an alkali metal dithionate in the aqueous absorbing solution;
(b) separating the alkali metal sulfur oxides formed and accumulated from part or the whole of the aqueous absorbing solution by crystallization;
(c) reusing the mother liquor obtained in step (b) as the aqueous absorbing solution for further exhaust gas treatment;
(d) subjecting the alkali metal sulfur oxides separated together with a carbonaceous material to decomposition-reduction reaction at a temperature of at least 700° C. to form an alkali metal sulfide and a gas containing sulfur dioxide and carbon dioxide;
(e) contacting part or the whole of the gas containing sulfur dioxide and carbon dioxide with part of the aqueous absorbing solution or an aqueous alkali solution to form a gas containing carbon dioxide free from sulfur dioxide;
(f) adding water and/or the mother liquor obtained in the following step (h) of separating an alkali metal carbonate and an alkali metal hydrogencarbonate to the alkali metal sulfide formed in step (d) to quench and to form an aqueous solution of the alkali metal sulfide;
(g) contacting the aqueous solution of the alkali metal sulfide with the gas containing carbon dioxide free from sulfur dioxide formed in step (e) to form hydrogen sulfide and an aqueous slurry containing the alkali metal carbonate and the alkali metal hydrogencarbonate; and
(h) separating the alkali metal carbonate and the alkali metal hydrogencarbonate from the aqueous slurry for reuse in the exhaust gas treatment.

17. The method as claimed in claim 16, wherein elemental sulfur is prepared from part of the gas containing sulfur dioxide and carbon dioxide formed in step (d) and the hydrogen sulfide formed in step (g).

* * * * *

UNITED STATES PATENT AND TRADEMARK OFFICE
CERTIFICATE OF CORRECTION

PATENT NO. : 4,186,176
DATED : Jan. 29, 1980
INVENTOR(S) : Taketsugu Kitamura et al It is certified that error appears in the above-identified patent and that said Letters Patent are hereby corrected as shown below:

Title Page Nov. 22, 1977 priority: Delete "13941" and insert --139412--.

Signed and Sealed this

Fifth Day of May 1981

[SEAL]

Attest:

RENE D. TEGTMEYER

Attesting Officer       Acting Commissioner of Patents and Trademarks